June 10, 1952 G. W. SOWER ET AL 2,600,135
ARTICLE LOWERING AND LOADING DEVICE
Filed Oct. 8, 1949 3 Sheets-Sheet 1
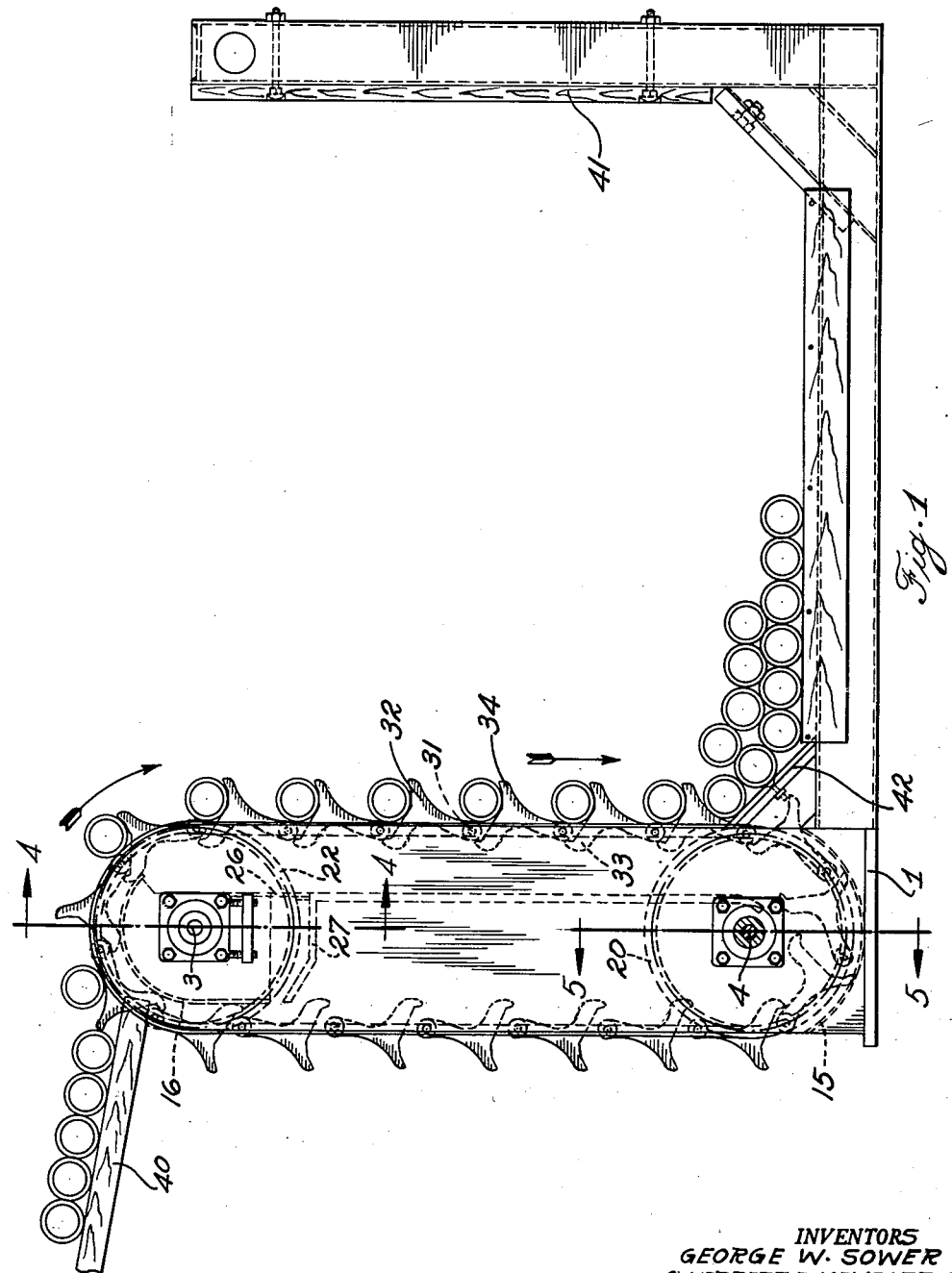
INVENTORS
GEORGE W. SOWER
& HERBERT J. MEYFARTH
BY
Richey Twatts
ATTORNEYS

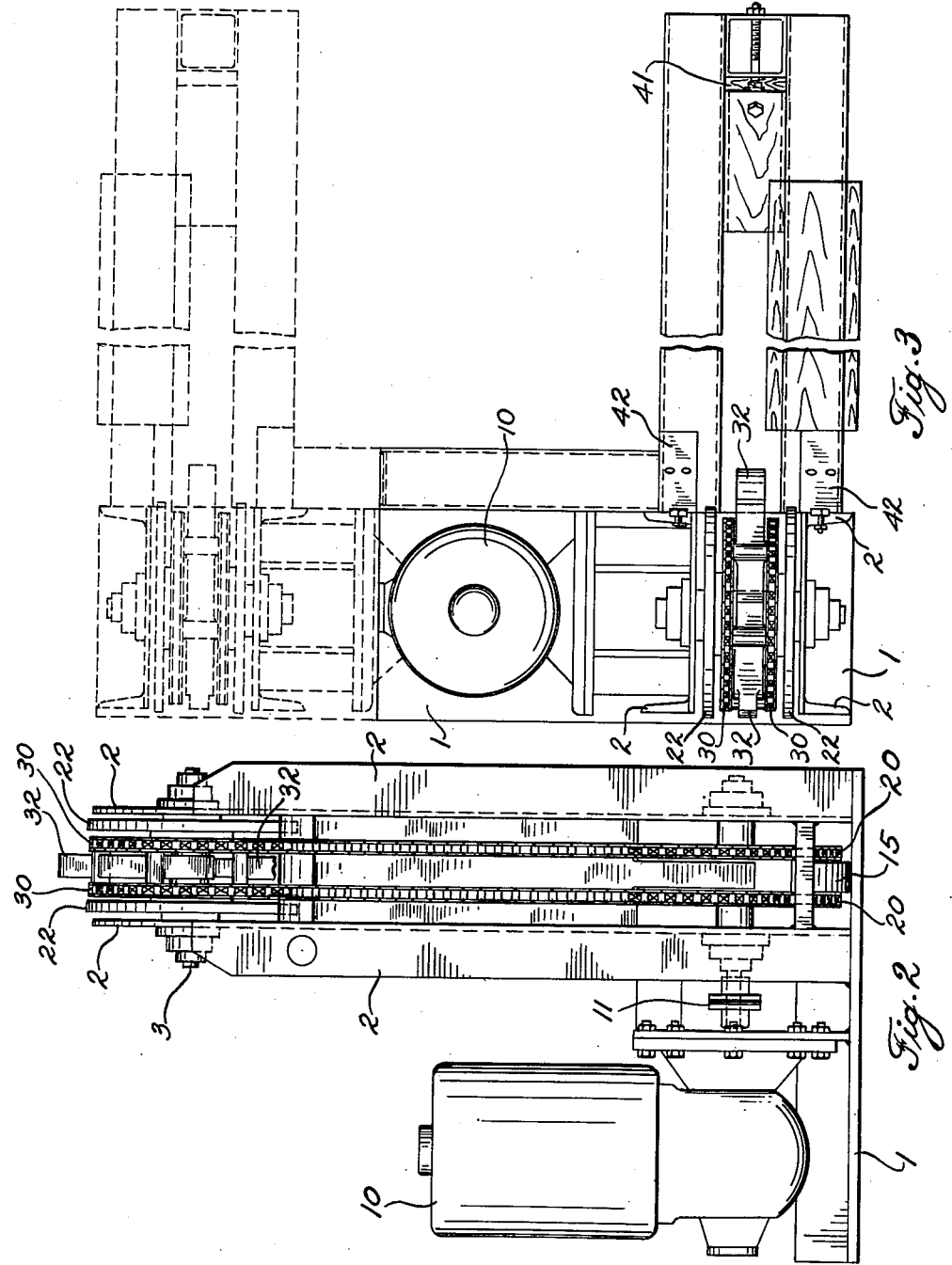

June 10, 1952  G. W. SOWER ET AL  2,600,135
ARTICLE LOWERING AND LOADING DEVICE
Filed Oct. 8, 1949  3 Sheets-Sheet 3

INVENTORS
GEORGE W. SOWER
& HERBERT J. MEYFARTH
BY
Richey & Watts
ATTORNEYS

Patented June 10, 1952

2,600,135

UNITED STATES PATENT OFFICE 2,600,135

ARTICLE LOWERING AND LOADING DEVICE

George W. Sower, Cleveland Heights, and Herbert J. Meyfarth, Willoughby, Ohio, assignors to Republic Steel Corporation, Cleveland, Ohio, a corporation of New Jersey Application October 8, 1949, Serial No. 120,300

7 Claims. (Cl. 198—155)

This invention relates generally to the materials handling art and especially to apparatus for lowering and loading elongated articles.

There are many elongated articles which must be lowered and deposited on a transporting device such as a crane lift, truck load, rack or the like and where it is quite desirable that the articles should not be roughly handled so as to mark or dent their surfaces. An example of these articles is thin walled electrical conduit. So far as we know, no one has heretofore devised apparatus suitable for this lowering and loading service, although many devices have been proposed for raising elongated articles.

The present invention makes it possible to lift articles one at a time off a skid, lower them toward a loading device and discharge them thereonto, all without subjecting the articles to rubbing or scraping action or impacts sufficient in intensity to deface or deform the walls of the articles.

The present invention will be better understood by those skilled in the art from the accompanying drawings which form a part of this specification, and the following description of the device shown in the drawings:

Fig. 1 is a side, elevational view of one form of apparatus embodying the present invention associated with a lifting frame and skid for elongated, thin walled steel tubes;

Fig. 2 is an end elevation taken from the left-hand side of Fig. 1;

Fig. 3 is a top, plan view of the apparatus of Fig. 1;

Figure 4:
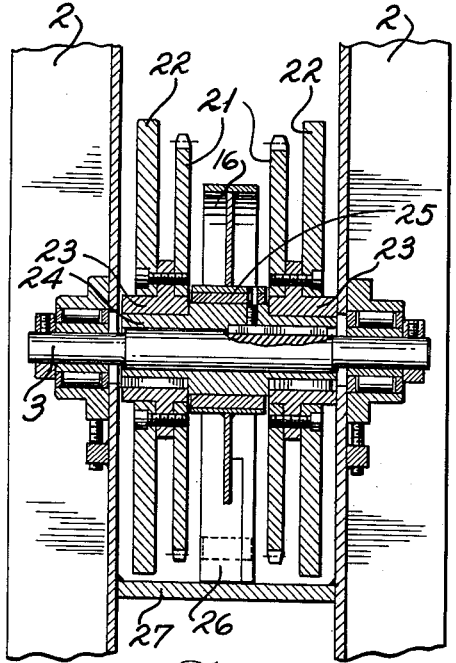
Figure 5:
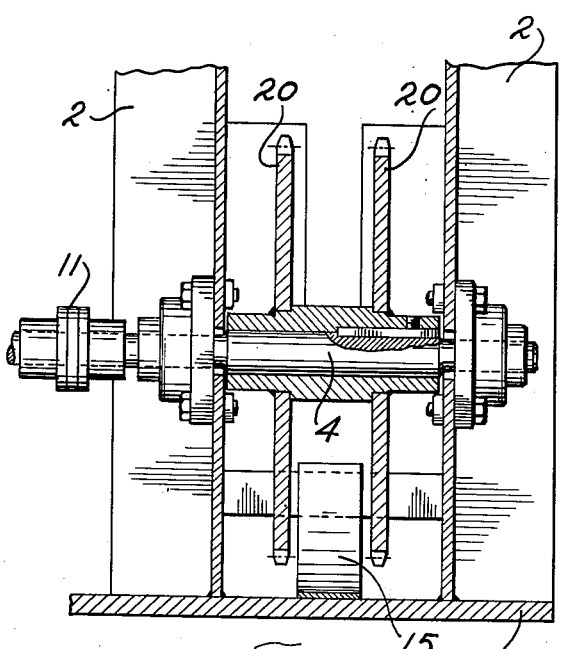
Figure 6:
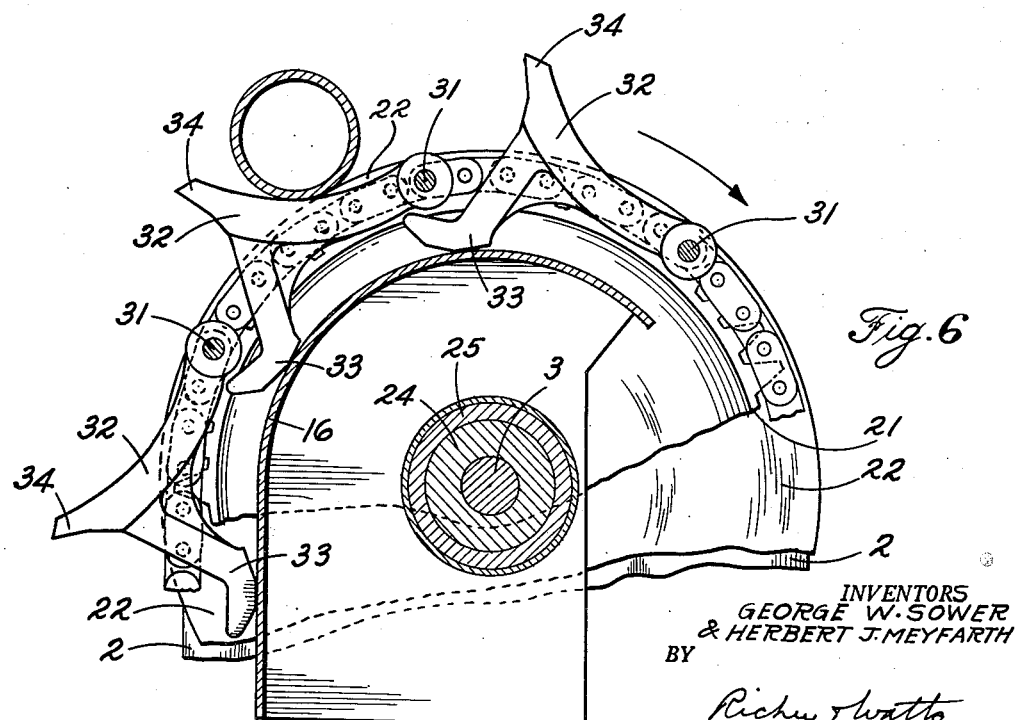

Figs. 4 and 5 are enlarged, vertical, sectional views taken on lines 4—4 and 5—5 of Fig. 1; and Fig. 6 is an enlarged, fragmentary, sectional view showing the cooperation of the dogs and one of their guides.

It will be understood that two or more units like those shown in Figs. 2 and 3 may be used together when articles are to be handled which are too long for proper handling by one of these units. One such unit is shown in full lines in Fig. 1 and another is shown in dotted lines. Since the units are all alike, a description of one unit will suffice for all.

The lowering and loading unit shown in the drawings includes a frame consisting of a base 1, vertical sides 2 and upper and lower shafts 3 and 4 which connect vertical sides 2 and maintain them in spaced relation. The base 1 supports a motor 10 which is connected through a suitable coupling 11 to shaft 4.

An arcuate guide 15 is mounted on base 1 between sides 2 for a purpose presently to appear. Another guide 16 extends vertically upward and then curves over the top of upper shaft 3 for a purpose also presently to be described.

The lower shaft 4 is provided with a pair of sprockets 20 which are spaced horizontally apart on the shaft and rotate with it. The guide 15 is positioned between these sprockets 20. The upper shaft 3 has a pair of sprockets 21 quite like sprockets 20 and vertically aligned therewith. Outside of sprockets 21 is positioned a pair of disks 22 which are slightly greater in diameter than sprockets 21. Sprockets 21 and disks 22 are fixed to collars 23 which are keyed to tubular bearing 24 which, in turn, is keyed to shaft 3. This assembly of sprockets 21, disks 22, collars 23, bearing 24 and shaft 3 constitutes an idler unit which is driven by motor 10 through a conveyor about to be described. This guide 16 is provided with a bearing 25 in which bearing 24 may turn and is also fixed against movement by a depending leg 26 which is attached to a cross wall 27 connected to the vertical sides 2 below shaft 3.

The conveyor of the unit comprises two endless chains, each extending around a lower sprocket 20 and an upper sprocket 21 vertically aligned therewith, transverse pins 31 which connect the chains 30 to each other and a plurality of dogs 32 which are rotatably mounted on pins 31 and positioned to pass between sprockets 20 and engage guide 15 and between sprockets 21 and engage guide 16. Each dog 32 is preferably Y shaped with the lower end of the Y pivoted on the pins 31 and having an inwardly projecting leg 33 and an outwardly diverging finger 34. The spacing between the pivotal points of adjacent dogs is preferably such that the tips of the leg and finger of one dog may engage the pivoted end of an adjacent dog so as to keep the dogs aligned within the range of movement permitted by the space between the tips of these legs and fingers.

As is shown in Fig. 1, a skid 40 slopes downwardly toward the unit and articles to be conveyed are allowed to roll down this skid to a point adjacent to the disks 22 whence the articles may be picked up by the dogs and lowered and transferred to a loading frame, designated generally at 41. As indicated, this frame has ledges 42 on the side thereof adjacent to the loading unit.

With the skid 40 provided with a supply of articles to be handled, and loading frame 41 in the position shown in Fig. 1, the unit may be operated as follows: The conveyor is moved clockwise in Fig. 1 and as the dogs are moved upwardly by the conveyor with their pivoted ends uppermost, the leg of one dog comes into contact with guide 16 which holds the dog in position for the fingers thereof to lift an article from skid 40 and transfer it to disks 22 and thence onto the load-carrying side of the finger of the preceding dog. As the dogs, each carrying an article, move along the substantially vertical, downwardly moving span, the dogs pivot outwardly until the tips engage the adjacent dogs but, due to the shape of the load-carrying surfaces of the fingers of the dogs, the articles are retained thereon while being lowered. As the first article is lowered into contact with ledges 42, the article is lifted off the descending dog by the ledges and rolls (in the case of a cylindrical article) along the bottom of the loading device 41. As succeeding articles are lowered into the loading device and the pile gradually builds up, the articles are removed from the dogs by a combination of the obstruction afforded by previously unloaded articles and a pivoting of the dogs inwardly to withdraw the fingers from beneath the articles. Thus, a quantity of articles may be lowered onto a loader and discharged onto the top of the load as the load builds up. In the case of cylindrical articles, they tend to distribute themselves across the loader by rolling down the side of the pile thereof.

After the descending dogs pass the ledges or obstructions 42, the fingers 34 come into contact with bottom guide 15 which pivots the dogs inwardly of the conveyor and then the dogs are permitted to assume freely their natural vertical position after they pass upwardly out of contact with the guide 15.

It will be noted that the dogs are permitted to pivot inwardly of the conveyor far enough to bring the extremities of the load-carrying fingers within a projection of the adjacent edges of frame sides 2 and that, hence, articles on the dogs will be removed therefrom even if previously unloaded articles are in actual contact with the adjacent edges of the frame 2. The loading of the articles from the skid onto the dogs is accomplished without impact or any scratching or marring action. The articles are carried by disks 22 just out of contact with the conveyor while passing around the upper curved part of the conveyor and onto the load-carrying fingers, the disks 22 preventing any scratching or marring of the articles during such travel and the articles are lowered and discharged onto the loader also without scratching, marring or subjecting them to marring or distorting impact forces.

It will be understood by referring to Fig. 1 that when articles several feet long are to be handled by the present invention, two or more of the units shown in full lines in Fig. 1 should be used. However, when the articles are short in axial length, one unit may be sufficient and if the dogs of one unit are not wide enough to handle such short articles satisfactorily, the dogs may be increased in width by rearranging the location of parts to accommodate wider dogs.

Having thus described the present invention so that others skilled in the art may be able to understand and practice the same, we state that what we desire to secure by Letters Patent is defined in what is claimed.

What is claimed is:

1. Apparatus for handling articles comprising a frame, an endless conveyor, vertically spaced shafts in the frame having means thereon for engaging and moving said conveyor, said conveyor having a substantially vertical span moving downwardly between said means, dogs mounted on the conveyor for rotation relative thereto, said dogs having article-carrying fingers provided with upwardly and outwardly inclined lower surfaces, an obstruction along the downward span of the conveyor and engageable with said surface for pivoting the dogs inwardly of the conveyor and away from said obstruction, and means engageable with articles on said dogs when the latter are so pivoted to discharge articles therefrom and from said fingers.

2. Apparatus for handling articles comprising a frame, an endless conveyor, vertically spaced shafts in the frame having means thereon for engaging and moving said conveyor, said conveyor having a substantially vertical span moving downwardly between said means, dogs mounted on the conveyor for rotation relative thereto, a guide adjacent to said upper shaft engageable with said dogs to maintain them in a predetermined position relative to said conveyor, said dogs having article-carrying fingers provided with upwardly and outwardly inclined lower surfaces, an obstruction along the downward span of the conveyor and engageable with said surfaces for pivoting the dogs inwardly of the conveyor and away from said obstruction, and means engageable with articles on said dogs when the latter are so pivoted to discharge articles therefrom and from said fingers.

3. Apparatus for handling elongated articles comprising a pair of units spaced apart from each other a distance less than the length of said articles, each unit including a frame, an endless conveyor, vertically spaced axes in the frame having means thereon for engaging and moving said conveyor, said conveyor having a substantially vertical span moving downwardly between said means, dogs mounted on the conveyor for rotation relative thereto, said dogs having article-carrying fingers provided with upwardly and outwardly inclined lower surfaces, an obstruction along the downward span of the conveyor and engageable with said surfaces for pivoting the dogs inwardly of the conveyor and away from said obstruction, and means engageable with articles on said dogs when the latter are so pivoted to discharge articles therefrom and from said fingers.

4. Apparatus for handling articles comprising a frame, pairs of parallel, horizontally spaced sprockets in said frame and having vertically spaced axes, an endless conveyor about said sprockets, dogs mounted on said conveyor for rotation relative thereto, said conveyor having a substantially vertical span moving downwardly between said sprockets, a guide between said upper pair of sprockets and engageable with said dogs to position them for moving articles from a skid onto said dogs for lowering on said downwardly moving span of the conveyor, means engaging said dogs on said span to pivot them on the conveyor and means disposed adjacent to the conveyor to engage and discharge articles from the descending dogs when they are so pivoted.

5. Apparatus for handling elongated articles comprising a frame, pairs of parallel, horizontally spaced sprockets in said frame and having vertically spaced axes, an endless conveyor comprising chains movable about said sprockets, transverse pins connecting the chains together and dogs mounted on said pins for rotation relative to said chains, said conveyor having a substantially vertical span moving downwardly between said sprockets, a guide between said upper pair of sprockets and engageable with said dogs to position them for moving elongated articles from a skid onto preceding dogs for lowering on said downwardly moving span of the conveyor, an obstruction in the path of the descending dogs, the dogs on the downwardly moving span engaging and being moved inwardly by said obstruction, and means disposed adjacent to the conveyor to engage and discharge articles from the descending dogs when they are so pivoted.

6. Apparatus for handling elongated articles comprising a frame, a pair of parallel, horizontally spaced sprockets in said frame and having vertically spaced axes, an endless conveyor comprising chains movable about said sprockets, transverse pins connecting the chains together and Y shaped dogs mounted at one end on said pins for rotation relative to said chains, each of said dogs having an inwardly projecting leg and an outwardly projecting finger, the leg and finger of each dog being engageable with the pivoted end of an adjacent dog, said conveyor having a substantially vertical span moving downwardly between said sprockets, a guide between said upper pair of sprockets and engageable with the legs of said dogs to position them for moving elongated articles from a skid onto the fingers of preceding dogs for lowering on said downwardly moving span of the conveyor, an obstruction on the downward span of the conveyor engageable with said fingers for pivoting movement of the fingers inwardly away from said obstruction and resultant discharge of articles from said fingers.

7. Apparatus for handling elongated articles comprising a frame, pairs of parallel, horizontally spaced sprockets in said frame and having vertically spaced axes, a pair of disks slightly larger in diameter than and spaced outside of the upper pair of said sprockets and rotatable therewith, an endless conveyor comprising chains movable about said sprockets, transverse pins connecting the chains together and dogs mounted on said pins for rotation relative to said chains, each dog having a leg and a diverging finger, said conveyor having a substantially vertical span moving downwardly from the upper to the lower pairs of sprockets, a guide between said upper pair of sprockets and engageable with the legs of said dogs to position them for moving elongated articles from a skid onto said outer disks and the fingers of preceding dogs, an obstruction adjacent to the downward span of the conveyor engageable with said fingers for pivoting movement of the latter away from said obstruction and resultant discharge of articles from said fingers.

GEORGE W. SOWER.
HERBERT J. MEYFARTH.

REFERENCES CITED

The following references are of record in the file of this patent:

UNITED STATES PATENTS

| Number | Name | Date |
| --- | --- | --- |
| 1,416,060 | Price | May 16, 1922 |
| 1,557,776 | Russell | Oct. 20, 1925 |

FOREIGN PATENTS

| Number | Country | Date |
| --- | --- | --- |
| 104,701 | Great Britain | Mar. 14, 1917 |